United States Patent Office 2,839,427
Patented June 17, 1958

2,839,427

COATED ARTICLE

Wilbert C. Bradshaw, Jr., Fresno, Calif.

No Drawing. Application July 12, 1954
Serial No. 442,913

3 Claims. (Cl. 117—131)

The present invention relates to coating compositions and in particular, to such compositions as are useful in the protective treatment of surfaces subject to rust, corrosion and other forms of surface deterioration.

The tendency of metallic surfaces to corrode or rust in the presence of air and water has always been considered an unfortunate property of metals. Attempts to provide an effective shield against such deterioration have resulted in great expenditures in time and money with less than complete success. Various surface films have been devised for the purpose. In some instances, metallic surfaces have been coated or plated with deposits of other metals less susceptible to deterioration than the principal metal or, most commonly, various paints have been provided for application over such surfaces.

Rigid or fixed coats, that is coating compositions which dry hard such as paint and the various metallic deposits or films, offer several disadvantages although of some limited success in preventing rust. Prior to the application of such materials it is necessary that old rust and other surface borne impurities be removed. Much time and effort is required in scrubbing, brushing, sand blasting or washing such surfaces in an attempt properly to precondition the same for treatment. A thorough cleaning job is rarely accomplished with the result that corrosion continues even after the protective coat has been applied.

The major disadvantage of hard drying coatings is that they tend to crack and peel and to develop fissures incident to expansion and contraction. This also may occur when the metal is exposed to excessive environmental temperatures. Such cracks or fissures in the coating provide passages for moisture to reach the principal metallic surface and rusting or other corrosive action is permitted to continue.

Accordingly, it is an object of the present invention to provide a coating composition of improved utility in stopping existing rust formations and in preventing further rust formation, corrosion and other surface deterioration.

Another object is to provide a coating composition which may be applied directly over old or new surfaces regardless of whether or not the surface is rusted or corroded and without the need for removing such rust or corrosion prior to the application of the coating composition.

Another object is to provide a coating composition useful in stopping and preventing rust which will not peel, flake, crack or develop fissures incident to the expansion and contraction of the object coated thereby or when subject to limited amounts of heat.

Another object is to provide a coating composition of the character described which when scratched or otherwise interrupted is self healing to reestablish its protective film.

Another object is to provide a coating composition which is permanently soft and amorphic.

Another object is to minimize dust collection by such a non-drying permanently soft and amorphic material.

Another object is to provide a coating composition which is waterproof

Another object is to provide a coating composition adapted for use on rusted surfaces which may be directly applied over the rust and which suspends the free rust in its own body and effectively interrupts continued oxidation.

Another object is to provide a coating composition for use on rusted surfaces which, when removed, acts to clean the surface of rust previously formed thereon.

Another object is to provide a coating composition of the character described useful not only on metallic surfaces but of protective advantage on wood, plastic, and other materials.

Another object is to provide a coating composition useful in preventing rust, corrosion and various forms of oxidation which may be made from a minimum number of ingredients in a simple manner and which may be used by even the most inexperienced person.

These and other objects will become apparent upon reference to the following description.

The rust resistant coating composition of the present invention comprises in general, a mixture of lithium grease, petrolatum and a powdered solid material dispersed throughout the lithium grease and petrolatum. The completed mixture forms a creamy composition.

The ingredient lithium grease is a well-known compound which includes approximately 12% by weight of lithium hydrate and hydrogenated vegetable fat. The balance is lubricating oil. The process by which this compound is made includes first, the formation of a stearate between the lithium hydrate and the hydrogenated vegetable oil. The stearate is then dropped into the lubricating oil for a jellying process. Subsequent to the jellying process it is passed through a Kuno filter into a milling machine and thence into packages for cooling. For the purposes of the present invention the lithium grease employed preferably has a drop out, or melting, point of approximately 350° F. and in appearance is green and buttery. Further, it is known to be an extreme pressure lubricant. In the composition of the present invention, the lithium grease provides among other advantages, a surface that is non soluble to water.

The ingredient petrolatum constituting a part of the composition comprises an amorphous wax extracted from crude mineral oil. This petrolatum has a melting or drop out point of approximately 125° F. and has a slight yellow tinge. In the mixture it aids in forming a surface film of the solid constituent grease. The lithium grease and petrolatum are found to have an affinity for each other, the latter acting as a carrying agent for the former in such a manner that when ruptures or scratches are developed in the coating, the petrolatum at a slow rate of flow carries the lithium grease throughout the surface to reheal such ruptures or scratches. Further, the petrolatum aid in penetration and it has known rust and oxidation resistant characteristics which it imparts to the mixture. Further advantages and characteristics of the petrolatum in the mixture will be discussed hereinafter.

The solid particles or powdered material forming another ingredient of the corrosion inhibiting composition of the present invention may be selected from powders made of aluminum, copper, zinc, glass, pentachlorophenol or other suitable materials. Such materials are preferably substantially inert or at least of a character which do not react to corrosive influences in their intended environment. Aluminum powder is preferred for most purposes. The size of such particles is macroscopic and in the range of approximately 100 to 300 mesh. In the mixture, these fine solid particles are carried to the surface of the coating by the petrolatum by a flotation process. Once these particles have reached the surface of the applied coat, they act as a barrier to dust, reflect light rays and heat, and further act as a surface armor even though they are somewhat easily displaced. As noted above, the petrolatum is also effective to relocate and redistribute the solid particles into an even layer when the coating composition is scratched or ruptured. The solid particles further provide a color to the coating composition of esthetic value.

In some instances it is desirable to add a trace of coloring agent such as an oil soluble blue dye, in the petrolatum to overcome the inherent yellow tinge or other undesirable hues in this or the other ingredients.

Some examples of workable and tested formulas are as follows:

1

52% by weight of lithium grease
40% by weight of petrolatum
8% by weight of aluminum electrolytically processed powder; 3 X D Reynolds designation; approximately three-hundred mesh
Trace of oil soluble blue dye

2

41% by weight of lithium grease
51% by weight of petrolatum
8% by weight of aluminum electrolytically processed powder; 3 X D Reynolds designation; approximately one-hundred mesh

3

60% by weight of lithium grease
32% by weight of petrolatum
8% by weight of aluminum electrolytically processed powder; 3 X D Reynolds designation; approximately three-hundred mesh

4

45% by weight of lithium grease
35% by weight of petrolatum
10% by weight of powdered zinc; approximately two-hundred mesh

5

43% by weight of lithium grease
51% by weight of petrolatum
6% by weight of powdered glass; approximately one-hundred mesh

6

40% by weight of lithium grease
50% by weight of petrolatum
10% by weight of powdered pentachlorophenol approximately three-hundred mesh

7

50% by weight of lithium grease
40% by weight of petrolatum
10% by weight of powdered copper; approximately two-hundred mesh Using example No. 1 as a standard, it has been found that the several constituents may be varied in themselves by as much as 20% plus or minus without affecting the resultant composition.

The ingredients are mixed together in a suitable container by stirring or the like until a substantially homogeneous mass is obtained having the general consistency of soft butter or cup grease.

Various tests have been performed utilizing a composition of the above formulas and these tests are referred to for descriptive convenience.

*Corrosion resistance test of clean and rusty iron*

Testing samples, that is, panels of rusty iron, clean iron and galvanized iron were coated with the composition of the above named formulas and immersed in water or 0.5% solution of sodium carbonate. The test samples were rotated in the two liquids for approximately ninety-six hours and then visually observed for signs of rusting. These tests were performed at temperatures of 100° F., 125° F., and 150° F. In the test at 120° F., the test samples were weighed prior to coating with the composition and after the test, were cleaned and reweighed. For the results of this test, reference is made to the following table:

| Temperature | 100° F. | 125° F. | 150° F. |
|---|---|---|---|
| Immersion time in hours | 96 | 96 | 96. |
| Coated rusty panel in water. | No rusting | No rusting | Some rusting. |
| Coating thickness | .01″–.02″ | .01″–.02″ | .01″–.02″. |
| Coated clean iron panel in water. | No rusting | No rusting | Very slight rusting. |
| Coated thickness | .01″–.02″ | .01″–.02″ | .01″–.02″. |
| Coated rusty panel in 0.5% Na₂CO₃ solution. | No rusting | | Slight rusting. |
| Coating thickness | | | .01″–.02″. |
| Coated clean iron panel in 0.5% Na₂CO₃ solution. | No rusting | | Very slight rusting. |
| Coating thickness | | | .01″–.02″. |
| Coated galvanized iron in water. | No rusting | | No rusting. |
| Coating thickness | .01″–.02″ | | .01″–.02″. |
| Coated rusty panel in water. | | Slight rusting | |
| Coating thickness | | .002″–.005″ | |
| Coated clean iron panel in water. | | No rusting | |
| Coating thickness | | .002″–.005″ | |
| Water, after test | Slight haze; no taste from coating composition. | Slightly oily; no taste from coating composition. | Oily and coating specks. |
| Plating effect | None | None | None. |

The results of this test show several characteristics of the coating composition. It is to be noted that the coating is effective up to temperatures approximating 125° F. to 150° F. even when immersed in agitated baths containing corrosive materials. Further, good corrosion protection at ordinary air and water temperatures is provided for the coated metal, even if the water contains as high as .5% by weight of sodium carbonate. When the water temperature exceeds 100° F. and the water flows over or against the coated metal, a slight oil separation may take place to an insignificant extent. It has been determined that the coating composition is most effective when applied to dry surfaces and in the case of iron, as noted by the test, the thickness of the coating should preferably be not less than about 1/64 inch. For best results, it is desirable to force the initial layer of the coating into the pores of the metal by a few brush strokes or other applying means and then with succeeding strokes to build up the thickness of the coating layer.

As above explained, and as further reinforced by the results of this test, the composition does not harden or crack but remains essentially at its original consistency. Because of its rather soft texture, the coating does not offer much mechanical resistance, but this is more than compensated for by its self-healing and flowability properties where removed from, or protected against, physical engagement by other objects.

A very unique and surprising result occurs when the coating composition is applied directly over a rusty coated panel. It is observed that the coating loosens portions of existing rust and suspends it in the body of the coating itself. Thus, the results of the test show that the composition stops existing rust formation, protects the surface against further rust formation and that if the coating is wiped off after having been applied to a rusty surface, a cleaner surface is obtained than originally existed.

Salt spray test

In this test six specimens of metal plate, having dimensions of approximately two inches by four inches were coated with the coating composition of the above described formula as follows:

1, galvanized iron, one 1/32 inch coat.
2, galvanized iron, two 1/32 inch coats.
3, clean mild steel, one 1/32 inch coat.
4, clean mild steel, two 1/32 inch coats.
5, rusted mild steel, one 1/32 inch coat.
6, rusted mild steel, two 1/32 inch coats.

These specimens were subjected to one-hundred hours of a salt spray in accordance with a standard procedure specified in the ASTM designation B117–49T. The test was conducted with a 20% salt solution at 100° F.

The results of this test showed by a visual examination of the specimens, that there were no breaks in the protective coating. There was no rusting, pitting or corrosion as a result of the test. Specimens No. 5 and No. 6, which were very badly rusted at the beginning of the test, showed excellent adhesion of the coating and no additional rusting.

Following a formula somewhat similar to that above named, the coating composition of this invention has been found quite useful in hardening wood surfaces. However, it has been found that pentachlorophenol is best utilized as the solid powdered material. When the coating composition is applied to a wood surface, the pentachlorophenol is crystallized by the wood to provide a harder wood surface. This action is believed to be synergistic and the exact theory of this crystallization is not known although the results are clearly provable.

An example of a formula for the treatment of wood is as follows:

52% by weight of lithium grease
40% by weight of petrolatum
8% by weight of pentachlorophenol; approximately three-hundred mesh
Trace of oil soluble blue dye Here again the percentages are not critical but may be varied in themselves by as much as plus or minus 20% without affecting the composition.

The utility and advantages of this invention are believed to be readily apparent and are briefly summarized at this point. Employing a coating composition having the ingredients of the above named formulas, or substituting in such formula powdered copper, zinc, glass, pentachlorophenol or comparable powdered solid constituent, a metallic surface which is desired to be protected against rust may be coated. The coating thickness should preferably be in the range of .01 to .02 inches. The coated surface should be dry prior to the application of the coating composition.

Assuming that the metallic surface to be coated is covered with previously formed rust, no brushing, scrubbing, rubbing or the like is necessary and the coating composition may be applied directly over such surface. In use, the powdered materials in the coating composition rise to the surface of the coat and form an exterior armor or barrier. This barrier has been found to resist dust, reflect light and to resist displacement of the coat to ordinary flow of water and the like. It has been found that when the coating composition is ruptured or scratched, the composition has a self-healing effect and flows back into place. This prevents rust from forming in cracks or fissures developed incident to the expansion or contraction of the coated surface. The coating is pliable, water and moisture proof and although applied as easily as a paint it is not a paint nor does it dry hard like a paint.

Many specific uses have been found for the coating composition as described herein. Some of these include application to evaporative coolers, condensate tanks and pans, cooling towers, television and radio towers, condensers, air-conditioning equipment, ship bottoms, pumps, brewery coils, and various other exposed frame work subject to rust or corrosion or excessive environmental temperatures. As above mentioned, the coating composition employing a vinyl plastic powder is useful in the hardening of wood surfaces.

Although the invention has been herein shown and described in what is conceived to be the most practical and preferred embodiments, it is recognized that departments may be made therefrom within the scope of the invention, which is not to be limited to the details disclosed herein but is to be accorded the full scope of the claims so as to embrace any and all equivalent methods, processes, devices, materials, and apparatus.

Having described my invention, what I claim as new and desire to secure by Letters Patent is:

1. The combination of an object having a surface which it is desired to protect from the air and air borne impurities, and a substantially non-drying protective coating borne by the surface comprising a layer of a mixture of lithium grease and petrolatum containing powdered solid material dispersed throughout said layer, the lithium grease being present in about 40% to 60% by weight of the total mixture and the petrolatum being present in about 50% to 30% by weight of the mixture, the layer having an inner surface against the surface of the object to be protected and an outer surface and the density of the powdered solid material being substantially greater at the outer surface than at the inner surface.

2. The combination of an object having a surface which it is desired to protect from the air and air borne impurities, and a coating borne by the surface comprising a layer of a substantially non-drying mixture of lithium grease and petrolatum containing particles of a corrosion resistant, light and heat reflective, solid material dispersed throughout the layer, the lithium grease being present in about 40% to 60% by weight of the total mixture and the petrolatum being present in about 50% to 30% by weight of the mixture, the layer having an outer surface outwardly disposed from the coated surface of the object and the density of the particles of solid material being appreciably greater at the outer surface than inwardly of the layer therefrom, the particles being of a size of approximately 100 to 300 mesh.

3. The combination of an object having a surface which it is desired to protect from the air and air borne impurities, and a coating borne by the surface comprising a substantially non-drying mixture of lithium grease and petrolatum containing particles of aluminum dispersed throughout the layer, the layer having an outer surface outwardly disposed from the coated surface of the object and the density of the particles of aluminum being appreciably greater at the outer surface than inwardly thereof, the lithium grease being present in about 40% to 60% by weight of the total mixture, the petrolatum in about 50% to 30% respectively of the mixture, and the aluminum in about 8% to 10% of the mixture and being of a particle size of approximately 100 to 300 mesh.

References Cited in the file of this patent

UNITED STATES PATENTS

| | | |
|---|---|---|
| 2,383,148 | Morgan | Aug. 21, 1945 |
| 2,388,166 | Luckenbach | Oct. 30, 1945 |
| 2,393,797 | Morgan | Jan. 29, 1946 |
| 2,430,846 | Morgan | Nov. 11, 1947 |
| 2,534,053 | Halloran | Dec. 12, 1950 |
| 2,641,551 | Smith et al. | June 9, 1953 |